United States Patent [19]

Pita et al.

[11] Patent Number: 4,801,321
[45] Date of Patent: Jan. 31, 1989

[54] METHOD FOR THE MANUFACTURING OF GLASS SHEETS

[75] Inventors: Antonio Pita, Garza Garcia; Guillermo Carro-de-la-Fuente, Guadalupe; Saul-Roman Ruiz-Ontiveros, Gaza Garcia, all of Mexico

[73] Assignee: Vidrio Plano, S.A., Monterrey, Mexico

[21] Appl. No.: 126,481

[22] Filed: Nov. 30, 1987

Related U.S. Application Data

[63] Continuation-in-part of Ser. No. 868,358, May 29, 1986, abandoned.

[51] Int. Cl.⁴ .................................. C03B 15/04
[52] U.S. Cl. .................................. 65/90; 65/94; 65/99.2; 65/196
[58] Field of Search ............... 65/90, 92, 93, 94, 99.2, 65/196

[56] References Cited

U.S. PATENT DOCUMENTS

| | | | |
|---|---|---|---|
| 3,218,143 | 11/1965 | La Jarte | 65/99.2 |
| 3,248,193 | 5/1966 | Hohmann | 65/65 |
| 3,806,396 | 4/1974 | Brichard et al. | 65/90 |

Primary Examiner—Arthur Kellogg
Attorney, Agent, or Firm—Abelman Frayne Rezac & Schwab

[57] ABSTRACT

A method of manufacturing glass sheets from molten glass contained in a vertical drawing chamber includes the step of placing a stratified liquid layer on the mass of molten glass, the stratified liquid layer comprising at least two phases of densities different to each other, and vertically drawing a glass sheet from the glass mass through the stratified liquid layer.

5 Claims, 5 Drawing Sheets $T_2$ $T_1 > T_2$ $T_1$

METHOD FOR THE MANUFACTURING OF GLASS SHEETS

This application is a continuation in part of Ser. No. 868,358 filed by May 29, 1986, now abandoned.

FIELD OF THE INVENTION

The present invention is related with the manufacturing of glass sheets by vertically drawing a glass sheet from a mass of molten glass contained in a vertical drawing chamber, and more specifically to a process for the manufacturing of glass sheets in which a stratified liquid layer which is essentially immiscible, not reactive in an undesirable way with the glass, takes no part of the glass sheet and having a density smaller than that of the glass, is placed on the molten glass mass in the bath and then the glass sheet is vertically drawn through said layer.

BACKGROUND OF THE INVENTION

Glass sheets are manufactured by vertically drawing a sheet from a molten glass mass, by processes known variously as Fourcault, Asahi, Colburn, P.P.G., etc.

In said processes, the molten glass mass passes from the furnace to a refining channel which ends at a vertical drawing chamber. The glass flows vertically through a draw bar or rolls (Asahi process) or is drawn from the free surface of the glass mass (P.P.G. process) wherein the temperature is of about 1000° C.

As the glass sheet is drawn by a series of pairs of rolls from above the glass mass, it is rapidly cooled by means of heat exchangers in order to prevent the rolls from marking the surface of the glass sheet and to produce a finish called fire finishing on the surface of the glass sheet.

The average thickness of the glass sheet at the drawing line depends on the drawing speed and temperature of the glass in the meniscus. Control of the thickness variation throughout the glass sheet, depends mainly on the control of the temperature along the meniscus and this is achieved in the previous art by means of heat exchangers and adjacent refractories.

At present, all vertical drawing machines can not produce glass sheets of a quality comparable to that of the float glass.

The glass quality is related with the degree of distortion present in the glass sheets (the greater the distortion the lesser the quality).

U.S. Pat. No. 3,248,193 of F. R. Hohmann, describes a method for drawing glass, comprising floating an essentially immiscible layer of liquid on the surface of the bath, pool or drawing chamber of molten glass mass, in an inert atmosphere to avoid oxidation of the floating liquid layer, and drawing a sheet of glass through said layer.

The sole objective of including the floating liquid layer, in accordance with said method, is to protect the drawn glass during its formative stage from extraneous forces such as air currents.

However, the real problem for the distortion failures in the glass sheet forming process was never envisioned in the process disclosed in said patent.

Applicants found that the method disclosed in said patent was not commercially implemented because of a limiting factor: the condition under which laboratory experiment was carried out to show the feasibility of said method, was that the whole system had to be at the same temperature. This involved that a total absence of convective currents both in the floating layer and in the glass mass, could be obtained only when the floating liquid layer and the glass mass in the drawing chamber were at the same temperature. In the practice it is hardly possible to operate the method under such conditions, because when one has the glass mass at a temperature different than that of the layer, convective currents hard to control will be generated both in said layer and in the glass mass.

It is well known that one of the causes of distortion in the glass sheets is due to the differences in the thickness thereof.

Applicants have also found that said difference in the thickness of the glass sheet is due that, during the drawing process, convective currents are generated in the molten glass mass because of the differences in the glass homogeneity and in the temperature thereinto, which affect the viscosity thereof and consequently the final thickness of the glass sheet.

Furthermore, applicants found that the viscous forces and the thermal diffusion could oppose said convective currents and therefore, by homogenizing the temperature and viscosity of the molten glass mass, said convective currents could be eliminated or damped.

And last but not least, applicants found that control of the temperature and viscosity homogeneity in the molten glass mass could be obtained by placing a stratified liquid layer having a smaller density than that of the glass, on the bath of molten glass in the vertical drawing chamber, so as to eliminate or dampen the convective currents in the glass mass, providing an homogeneous glass mass which, on applying hydrostatic pressure through the same stratified liquid layer, helps in producing a uniform distribution of the thickness of the glass throughout the glass sheet, thus diminishing the causes of distortion.

Said stratified liquid layer may comprise a single layer having variable density or several layers having different densities appearing as a multiple phase layer.

SUMMARY OF THE INVENTION

It is therefore a main object of the present invention, to provide a method for the manufacturing of glass sheets wherein the temperature and viscosity of the molten glass mass in the bath are controlled to be homogeneous, and hydrostatic pressure is applied over the glass mass, in order to eliminate or dampen the convective currents in said molten glass mass and promote a uniform distribution of the thickness throughout the glass sheet, thus diminishing the causes of distortion.

It is also a main object of the present invention, to provide a method for the manufacturing of glass sheets, wherein control of the temperature and viscosity of the molten glass mass in the drawing chamber as well as the application of hydrostatic pressure over said glass mass, is carried out by placing a stratified liquid layer having a smaller density than that of the glass, on said molten glass mass in the drawing chamber.

It is still a main object of the present invention, to provide a method for the manufacturing of glass sheets, comprising: controlling the temperature and viscosity of the molten glass mass, by placing a stratified liquid layer having a smaller density than that of the glass and which is essentially immiscible and non reactive with the glass in any undesired way, and takes no part of the glass sheet, over the molten glass mass in the drawing chamber; and withdrawing a sheet of glass through said stratified liquid layer.

These and other objects and advantages of the method of the present invention will be apparent to the persons skilled in the art, from the following detailed description of the invention.

DETAILED DESCRIPTION OF THE INVENTION

Figure 1:
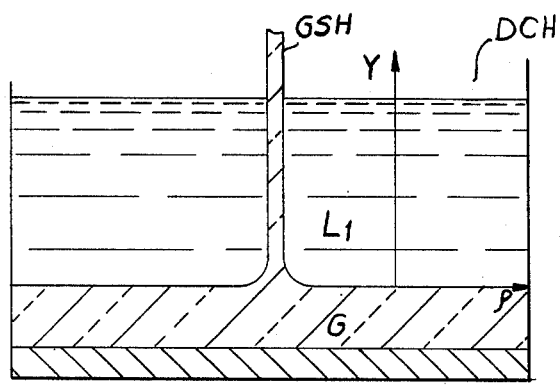
FIG. 1 is a schematic, partial cross sectional view of a drawing chamber having a molten glass mass, showing a glass sheet being drawn in accordance with a first embodiment of the method of the present invention.

Referring to FIG. 1, the method for the manufacturing of glass sheets, of the present invention, comprises: controlling the temperature and viscosity of the molten glass mass G by placing a stratified liquid layer L1 having a smaller density than that of the glass, which is essentially immiscible and non reactive with the glass, in an undesirable way, and takes no part of the final glass sheet, on the molten glass G contained in the vertical drawing chamber DCH; introducing a bait (non illustrated) into said vertical drawing chamber DCH; withdrawing said bait in contact with the said molten glass G from said chamber DCH; and drawing vertically a glass sheet GSH through said stratified liquid layer L1.

Figure 1A:
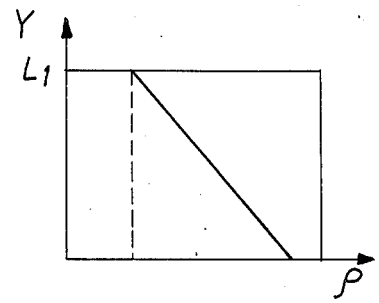
FIG. 1A is a graphic plotting the even variation of the density regarding the thickness of the stratified liquid layer shown in FIG. 1.
Figure 9:
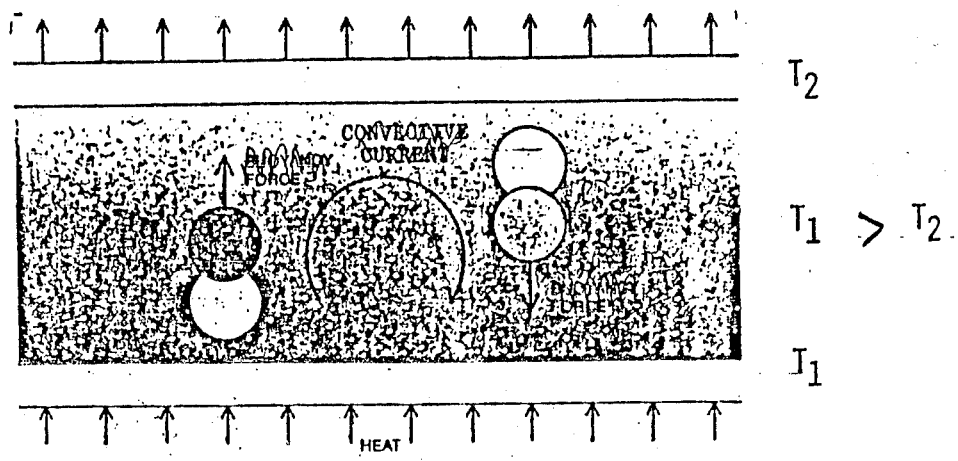
FIGS. 9 to 11 are schematic views showing the behavior of the convective currents in the molten glass mass, regarding its temperature and viscosity.
Figure 10:
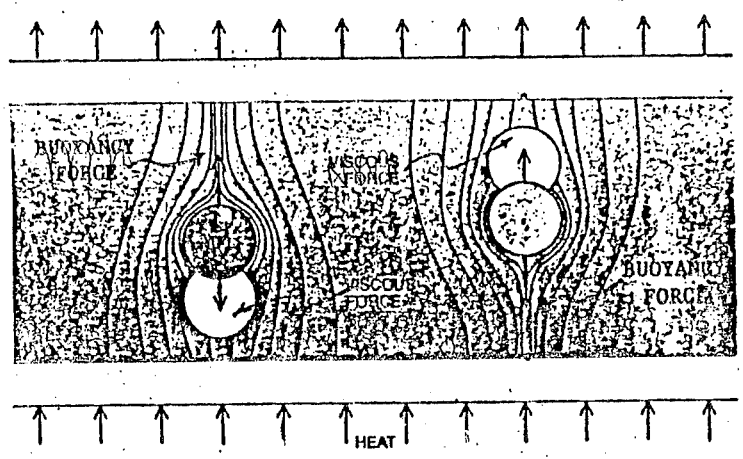
Figure 11:
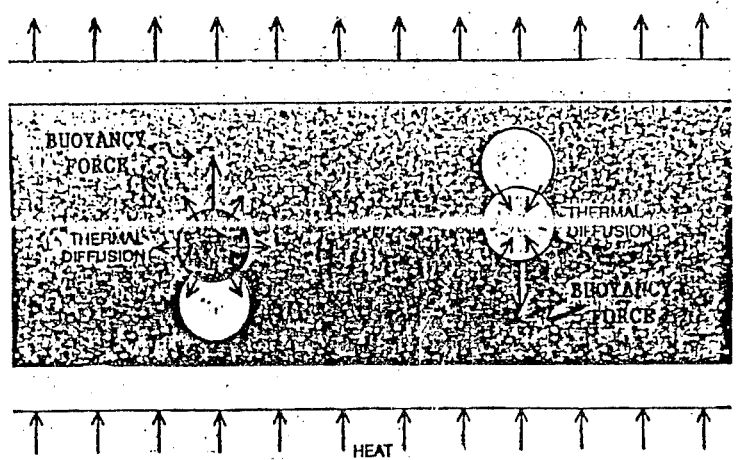

The purpose of placing said stratified liquid layer L1, is to control the temperature and viscosity of the molten glass G, through the stratified density of the liquid layer L1 as illustrated in FIG. 1A, in order to eliminate or dampen the convective currents (FIG. 9) both in the stratified layer L1 and in the molten glass, homogenizing the temperature and viscosity of the molten glass G throughout the drawing chamber DCH, and to apply a hydrostatic pressure to the glass sheet GSH which is being drawn to promote a uniform distribution of the thickness throughout the glass sheet GSH and to avoid the causes of distortion therein.

Figure 2:
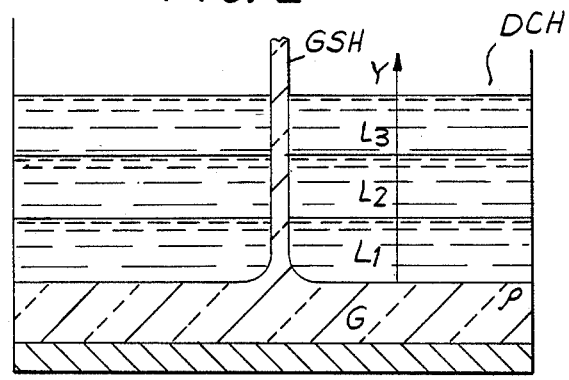
FIG. 2 is a schematic view similar to FIG. 1 showing a second embodiment of the method of the present invention.
Figure 3:
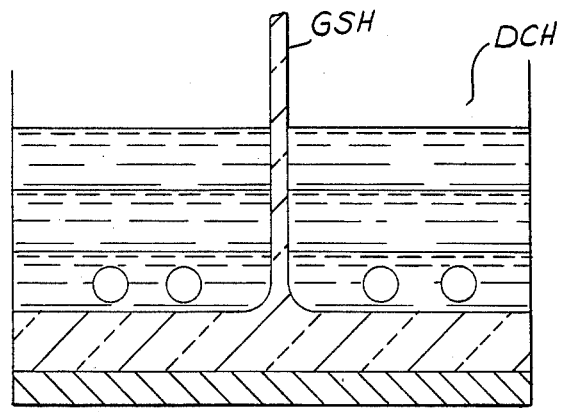
FIG. 3 is a schematic view similar to FIGS. 1 and 2, showing the introduction of heating means to control the temperature the stratified liquid layer and consequently the temperature and viscosity of the molten glass mass in the drawing chamber.
Figure 2A:
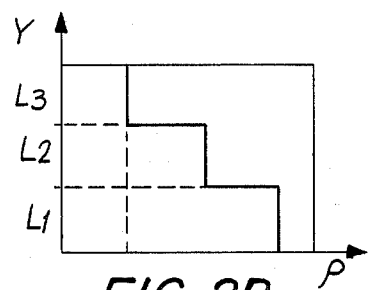
FIGS. 2A, 2B and 2C are graphics similar to FIG. 1A, showing three possibilities of a variation of the density of the stratified liquid layer shown in FIG. 2.
Figure 2B:
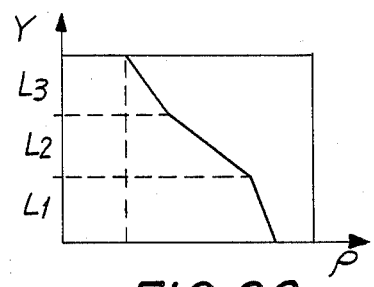
Figure 2C:
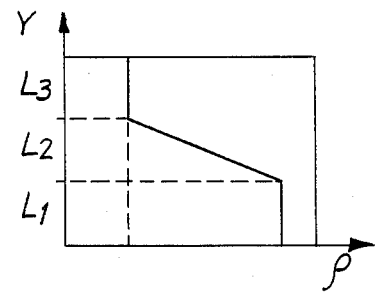

Said stratified liquid layer may comprise a single liquid layer L1, or several liquid layers L1, L2, L3, of different densities appearing as a multiple phase layer as illustrated in FIG. 2, and in which, each phase could be comprised either of a homogeneous liquid or a liquid of variable density or a combination of both as it is illustrated in FIGS. 2A, 2B and 2C, thus allowing in the later case the formulation of convective zones within layers L1 and L3, and a non convective temperature gradient zone L2, and wherein, in the first convective zone L1, heating means HE could be introduced in order to control the temperature in said convective zone L1 as is shown in FIG. 3.

In order to isolate the drawing chamber DCH from any oxidizing atmosphere caused by the selection of metals as the stratified liquid layers, it could be necessary to introduce an inert gas such as nitrogen, (not illustrated) so as to establish a controlled atmosphere which protects the metal liquid layers from oxidation.

Figure 4:
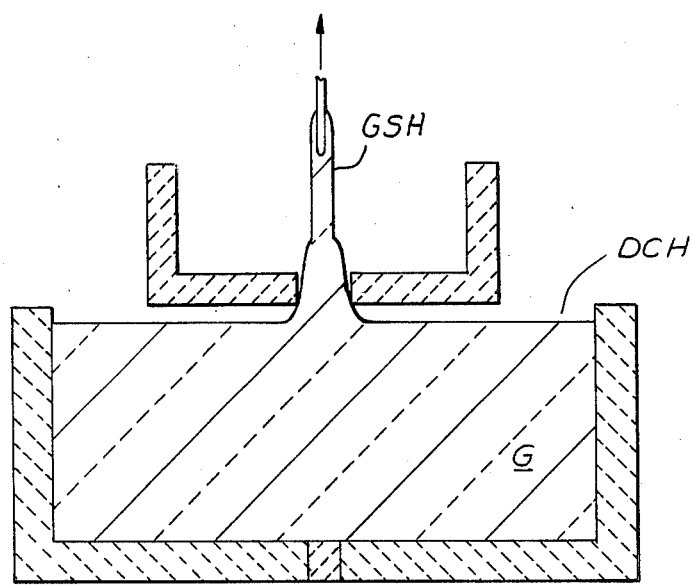
FIGS. 4 to 7 are schematic partial views of the drawing chamber showing a sequence of the method of the present invention, when a stratified liquid layer having a greater density than that of the glass, is used.
Figure 5:
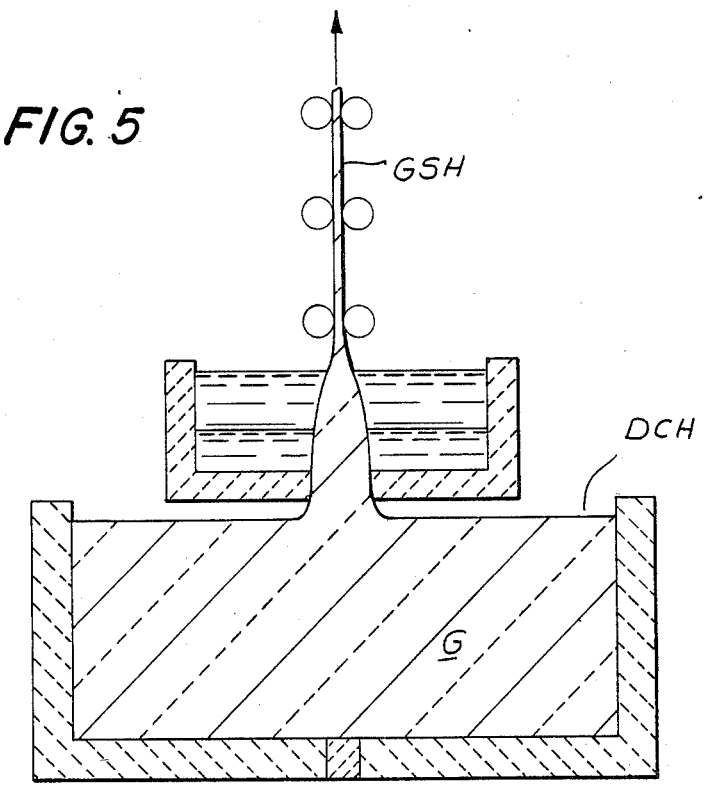

Another embodiment of this invention, is that said liquid layer L1 or layers L1, L2, L3, over the molten glass can be of a liquid or liquids having a grater density than that of glass G, but in this case said layer or layers must be introduced over a plate or container placed on the surface on the molten glass G, allowing contact on the liquid with the glass G, only in the drawing zone. In this case, the control of the temperature operates in both the longitudinal and in the cross sectional directions along the width of said glass sheet GSH only. For this purpose, it is first necessary to allow the glass to be drawn through an aperture in said plate or container, as illustrated in the sequence of FIGS. 4 and 5 of the drawings, in order to avoid said denser liquid being poured to the bottom of the glass.

Figure 6:
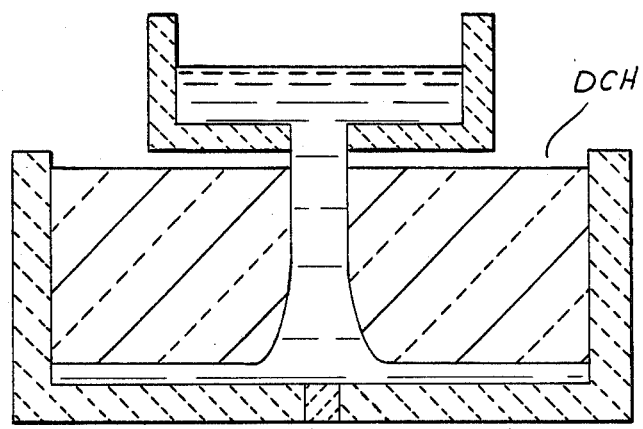
Figure 7:
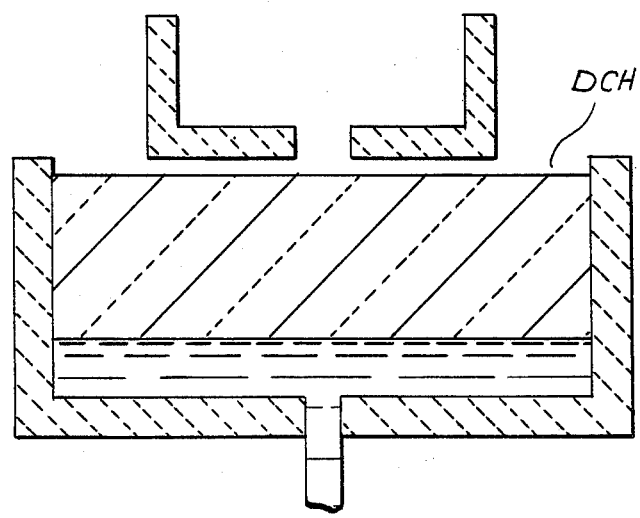

To stop the machine, the glass sheet is interrupted allowing the liquid to be drained into the drawing chamber DCH and to be recover by selective withdrawal, as is illustrated in FIGS. 6 and 7; or else as an alternative, said liquid is extracted before the glass sheet GSH flow be interrupted.

Figure 8:
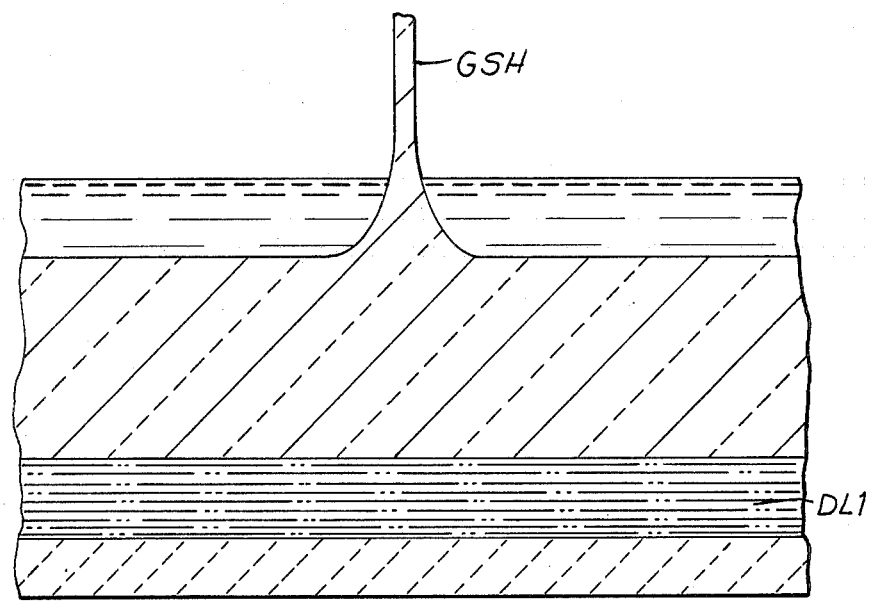
FIG. 8 is a schematic view similar to FIGS. 1 and 2, showing a third embodiment of the method of the present invention.

Furthermore, it can be introduced below the molten glass mass, a further stratified liquid layer DL1 denser than the molten glass, as is illustrated in FIG. 8 of the drawings, in order to control the heating curve so as to make it as flat as desired and to subject the glass G to uniform pressure, thus allowing a better control of the thermal conditioning of the glass.

The stratified liquid layer or layers may be mainly selected from a plurality of mixtures of aluminum and magnesium combined under different concentrations, as well as some other systems such as those of Al-Ca, Al-Li, Al-Na, Ca-Mg, Li-Mg, Al-Si, etc., in order to promote the stratified layers by reason of their different densities.

In the following there are some examples of stratified layer formation on an specific kind of glass for the manufacturing of glass sheets.

EXAMPLE 1

A "soda-lime" type glass mass, having the following composition (in % by weight), was melted in a bath:
$SiO_2$: 72.6%
$Al_2O_3$: 1.0%
$CaO$: 6.4%
$MgO$: 1.7%
$B_2O_3$: 1.43%
$Na_2O_3$: 16.0%
$K_2O_3$: 0.68%

Said molten glass having a density which varies between 2.42 and 2.35 $gr/cm^3$ in the working temperature range of 750° to 1,110° C.

At said temperature range, a liquid layer of 30 cm containing 60% of aluminum and 40% of magnesium and having a melting point of 460° C. and a boiling point above 1100° C., was placed over said molten glass.

The temperature gradient into said liquid layer, cause a diffusibility of the materials—phenomena known as "Soret Effect"—by which a natural stratification of densities is produced into said layer. Such densities varying in a range of 2.27 to 1.97 gr/cm³ and consequently said liquid layer floats over the melted glass.

Then, a bait is introduced into the glass adhering it in order to allow a continuous vertical withdrawing through said stratified liquid layer floating over the glass. In this way, an extremely flat glass sheet having an even thickness and a surface free of any metallic film from the liquid layer, is obtained.

To avoid oxidation and combustion into said stratified liquid layer floating over the glass, a protective inert atmosphere such as those of argon or nitrogen, may be used.

EXAMPLE 2

On a molten glass of similar composition as in example 1, three liquid layers were placed as following:

Over said molten glass a liquid layer of 10 cm thick, having a composition of 70% of aluminum and 30% of magnesium, a melting point of 490° C. and a boiling point above of 1100° C., was placed. The density of this alloy varies from 2.12 to 2.04 gr/cm³ in the temperature range of 750° to 1100° C.

Over the former liquid layer, a second liquid layer of 10 cm thick having a composition of 73% of calcium and 27% of aluminum, a melting point of 545° C. and a boiling point above of 1100° C., was also placed. The density of this alloy varies from 1.65 to 1.57 gr/cm³ in the temperature range of 750° to 1100° C.

A third liquid layer of 10 cm thick having a composition of 80% of calcium and 20% of magnesium, a melting point of 460° C. and a boiling point over 1100° C., was placed over the second liquid layer. The density of this alloy varies from 1.43 to 1.35 gr/cm³ in the temperature range of 750° to 1100° C.

Through these three liquid layers floating on the molten glass, a bait is introduced into said melted glass, adhering said glass to said bait, withdrawing vertically a glass sheet. The drawn glass sheet is well flat and has an even thickness and a surface free of any metallic film from the liquid layers floating over the glass.

To prevent oxidation and combustion into the upper liquid layer, a humidity free argon atmosphere is used.

EXAMPLE 3

An alloy having 92% tin and 8% antimony—known as white metal—was melted. The alloy melts at a temperature of about 240° C. The temperature of the liquid is elevated up to the operation temperature (about 1200° C.). The density of said liquid at said temperature is in the order of 6.33 gr/cm³ which is higher than that of the glass.

Over said liquid bath, a melted glass having characteristics similar to that of example 1, is poured.

The temperature gradient into said lower liquid layer cause a diffusibility of the component materials—phenomena known as "Soret Effect"—by which a natural stratification of densities is produced.

Over the molten glass, liquid layers such as those of examples 1 and 2 are placed, in order to form a liquid system having stratified densities, in which the glass constitute one of said layers.

The drawing process of the glass is carried out as disclosed in examples 1 and 2.

| OTHER ALLOYS TO FORM STRATIFIED LIQUID LAYERS OVER THE GLASS | |
| --- | --- |
| System Mg—Al: | |
| ALLOY (% by weight) | DENSITY (gr/cm³) |
| 90% Mg—10% Al | 1.830 |
| 70% Mg—30% Al | 2.023 |
| 50% Mg—50% Al | 2.22 |
| 30% Mg—70% Al | 2.41 |
| System Al—Ca | |
| Eutectic at 73% Ca, 545° C. | |
| Eutectic at 7.6% Ca, 660° C. | |
| System Al—Mg | |
| Eutectic at 67.7% Mg, 437° C. | |
| System Al—Li | |
| Eutectic at 9.9% Li, 600° C. | |
| System Al—Na | |
| Immiscibility at 659.2° C., $L_1 + L_2$ | |
| System Ca—Mg | |
| Eutectic at 16.12% Ca, 517° C. | |
| Eutectic at 81.70% Ca, 447° C. | |
| System Li—Mg | |
| Eutectic at 7.5% Li, 589° C. | |
| System Al—Si | |
| Eutectic at 12.6% Si, 577° C. | |

| SALTS TO BE PLACED OVER THE ALLOYS (COMPOSITIONS IN % BY WEIGHT) | | | | | | | | | | | | | |
| --- | --- | --- | --- | --- | --- | --- | --- | --- | --- | --- | --- | --- | --- |
| | 1 | 2 | 3 | 4 | 5 | 6 | 7 | 8 | 9 | 10 | 11 | 12 | 13 |
| $MgCl_2$ | 53 | 68 | 14 | 34 | 50 | 70 | 31 | 60 | 50 | 37 | | | |
| NaCl | 12.5 | | 31 | | | | | | | | 5 | | |
| KCl | 33 | 24 | 11 | 55 | 20 | | 37 | | | 10 | 57 | 23 | |
| $CaCl_2$ | | | 44 | | | | | | | 14 | 28 | | |
| NaF | | 5 | | | | | 6 | | | | | | |
| $CaF_2$ | | 3 | | 2 | 15 | 20 | 21 | | | 21 | 25 | 25 | 13 |
| $MgF_2$ | | | | | | | | 40 | 20 | | | | |
| MgO | 1.5 | | | | 15 | 10 | 5 | | | 10 | 13 | | 11 |
| $MgCO_3$ | | | | | | | | | 20 | | | 12.5 | |
| $BaCl_2$ | | | | | | | | | | | | 12.5 | |
| $MnCl_2$ | | | | | | | | | | | | | 76 |

What is claimed is:

1. A method of manufacturing glass sheets from a molten glass mass contained in a drawing chamber, including the steps of:

controlling the temperature and viscosity of said molten glass mass for it to be substantially homogenous;

placing a stratified liquid layer on said molten glass mass contained within said drawing chamber, said stratified liquid layer being substantially immiscible with said molten glass mass and comprising at least two phases of densities different to each other; and, vertically drawing a glass sheet through said stratified liquid layer from said molten glass mass;

whereby, said stratified liquid layer dampens convective currents occurring both in said stratified liquid layer and in said molten glass mass, and applies a uniform hydrostatic pressure to said molten glass mass and to the glass sheet during the drawing thereof in order to promote uniform distribution of thickness throughout the drawn glass sheet and diminish causes of distortion in the drawn glass sheet.

2. The method of claim 1, wherein said stratified liquid layer is substantially non-reactive with said molten glass mass, and forms no part of the drawn glass sheet, such stratified liquid layer having a density less than that of the molten glass mass in order for the stratified liquid layer to float on the molten glass mass in physical contact therewith.

3. The method of claim 1, in which said stratified liquid layer has a density greater than that of said molten glass mass, and is placed on the molten glass mass over a plate positioned in contact with the surface of the molten glass mass, then initiating drawing of a glass sheet through a slot in said plate for it to provide a plug, and then placing said stratified liquid layer over said plate.

4. The method as claimed in claim 1, wherein said stratified liquid layer comprises several phases, each of which having a variable density and different densities to each other.

5. The method as claimed in claim 1, wherein said stratified liquid layer or layers are selected from the group consisting in mixtures of Al-Mg, Al-Ca, Al-Li, Al-Na, Al-Si, Ca-Mg, Li-Mg, combined under different weight percentages, as well as from salt combinations of $MgCl_2$, $NaCl$, $KCl$, $CaCl_2$, $NaF$, $CaF_2$, $MgF_2$, $MgO$, $MgCO_3$, $BaCl_2$, $MnCl_2$, also in several combinations and weight percentages, in order to promote the stratified layers by reason of their different densities.

* * * * *